(12) United States Patent
Shaw

(10) Patent No.: US 8,162,669 B1
(45) Date of Patent: Apr. 24, 2012

(54) ULTRASOUND TRAINING ASSEMBLY

(76) Inventor: Erin L. Shaw, LaFontaine, IN (US)

( * ) Notice: Subject to any disclaimer, the term of this patent is extended or adjusted under 35 U.S.C. 154(b) by 477 days.

(21) Appl. No.: 12/502,460

(22) Filed: Jul. 14, 2009

(51) Int. Cl.
*G09B 23/28* (2006.01)

(52) U.S. Cl. ....................................... 434/272; 434/267

(58) Field of Classification Search .................. 434/262, 434/267, 268, 272, 295, 296; 73/866.4
See application file for complete search history.

(56) References Cited

U.S. PATENT DOCUMENTS

| | | | |
|---|---|---|---|
| 2,689,415 A | 9/1954 | Haver | |
| 2,995,832 A | 8/1961 | Alderson | |
| 3,789,518 A | 2/1974 | Chase | |
| 5,052,934 A * | 10/1991 | Carey et al. .................. | 434/268 |
| 5,518,407 A | 5/1996 | Greenfield et al. | |
| 5,839,904 A | 11/1998 | Bloom | |
| 6,190,915 B1 * | 2/2001 | Madsen et al. .................. | 436/8 |
| 6,205,871 B1 * | 3/2001 | Saloner et al. ............... | 73/866.4 |
| 6,511,325 B1 * | 1/2003 | Lalka et al. ................... | 434/272 |
| 7,008,232 B2 * | 3/2006 | Brassel ........................ | 434/268 |
| 7,059,168 B2 * | 6/2006 | Hibi et al. ....................... | 73/1.86 |
| D534,216 S | 12/2006 | Makower et al. | |
| 7,255,565 B2 * | 8/2007 | Keegan ........................ | 434/272 |
| 7,427,199 B2 * | 9/2008 | Sakezles ........................ | 434/267 |
| 7,845,949 B2 * | 12/2010 | Wilkins et al. ................ | 434/268 |
| 7,850,456 B2 * | 12/2010 | Chosack et al. .............. | 434/272 |
| 7,857,626 B2 * | 12/2010 | Toly .............................. | 434/267 |
| 7,866,983 B2 * | 1/2011 | Hemphill et al. ............. | 434/262 |
| 2008/0076101 A1 * | 3/2008 | Hyde et al. ..................... | 434/272 |

* cited by examiner

*Primary Examiner* — Kurt Fernstrom

(57) ABSTRACT

An ultrasound training assembly includes a tubular member that has a first end, a second end and a perimeter wall extending between the first and second ends. The perimeter wall has an aperture therein. A model representing an ultrasound probe includes a grip and a head attached together. The head has a distal edge with respect to the grip. The distal edge is elongated. An elongated member is attached to the distal edge and has a longitudinal axis orientated perpendicular to a longitudinal axis of the model extending through the distal edge and a free end of the grip. The elongated member is spaced from the distal edge a distance between 0.5 inches and 2 inches. The elongated member is placed in the tubular member through the aperture to represent a vein which would be seen by an ultrasound probe represented by the model.

8 Claims, 3 Drawing Sheets

ULTRASOUND TRAINING ASSEMBLY

BACKGROUND OF THE DISCLOSURE

1. Field of the Disclosure

The disclosure relates to sonography training devices and more particularly pertains to a new sonography training device for assisting a person in understanding the location of a vein located in a limb by an ultrasound probe.

2. Summary of the Disclosure

An embodiment of the disclosure meets the needs presented above by generally comprising a tubular member that has a first end, a second end and a perimeter wall extending between the first and second ends. The perimeter wall has an aperture therein. A model representing an ultrasound probe includes a grip and a head attached together. The head has a distal edge with respect to the grip. The distal edge is elongated. An elongated member is attached to the distal edge and has a longitudinal axis orientated perpendicular to a longitudinal axis of the model extending through the distal edge and a free end of the grip. The elongated member is spaced from the distal edge a distance between 0.5 inches and 2 inches. The elongated member is placed in the tubular member through the aperture to represent a vein which would be seen by an ultrasound probe represented by the model.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
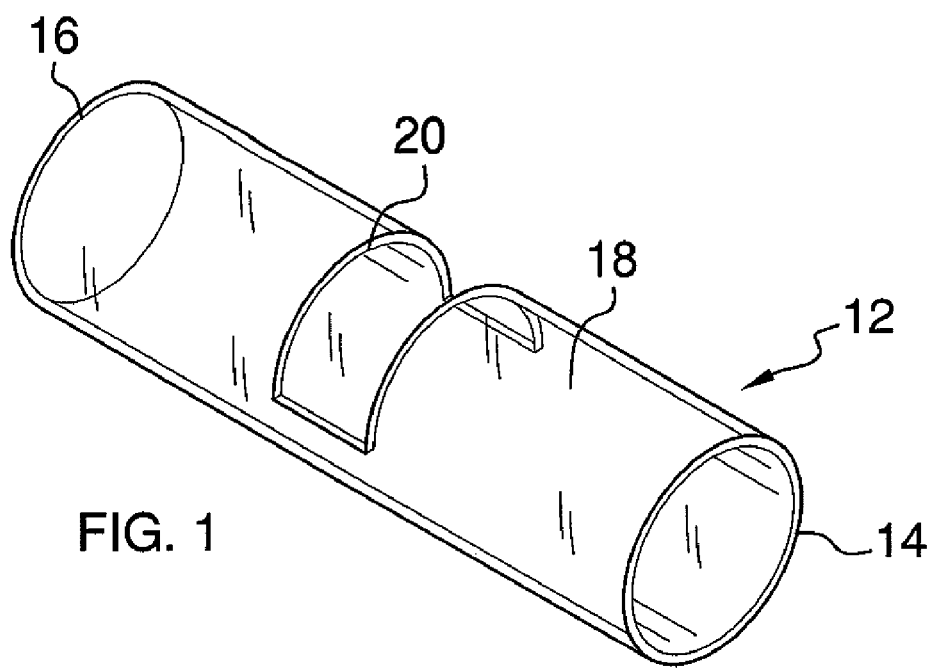
FIG. 1 is a top perspective view of a tubular member of an ultrasound training assembly according to an embodiment of the disclosure.
Figure 2:
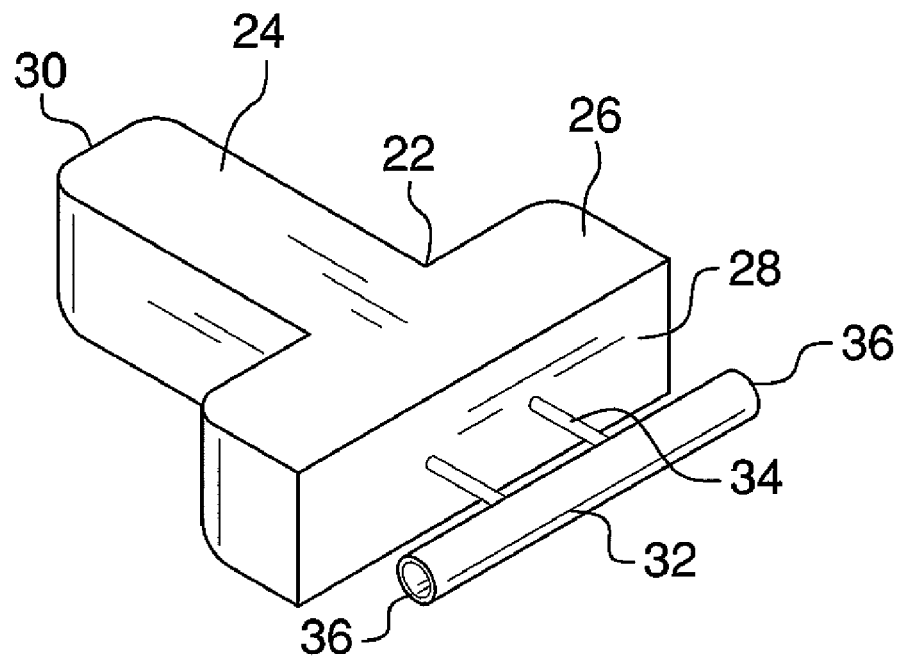
FIG. 2 is a top perspective view of an embodiment of the disclosure.

With reference now to the drawings, and in particular to FIGS. 1 through 5 thereof, a new sonography training device embodying the principles and concepts of an embodiment of the disclosure and generally designated by the reference numeral 10 will be described.

Figure 3:
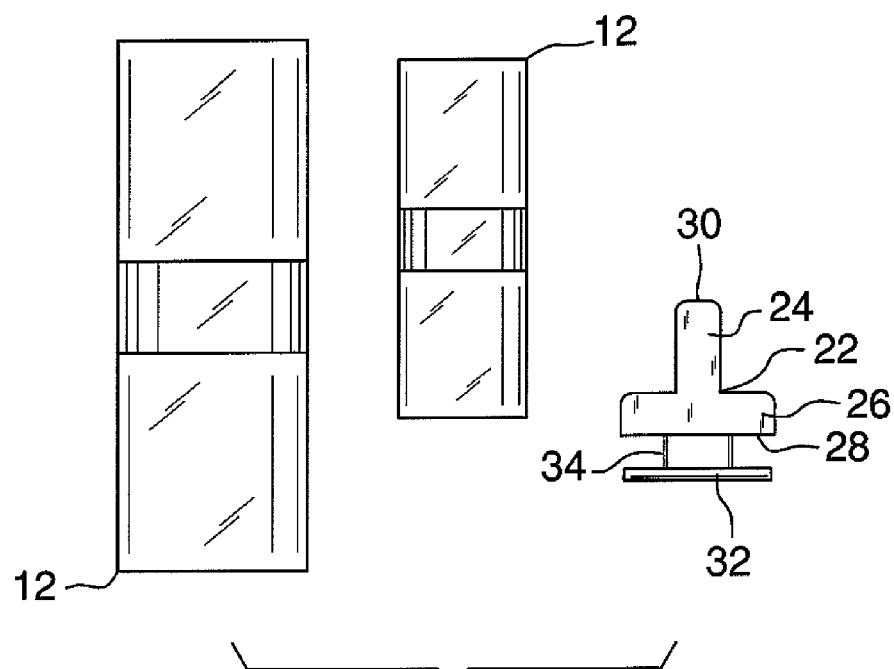
FIG. 3 is a top view of an embodiment of the disclosure.
Figure 4:
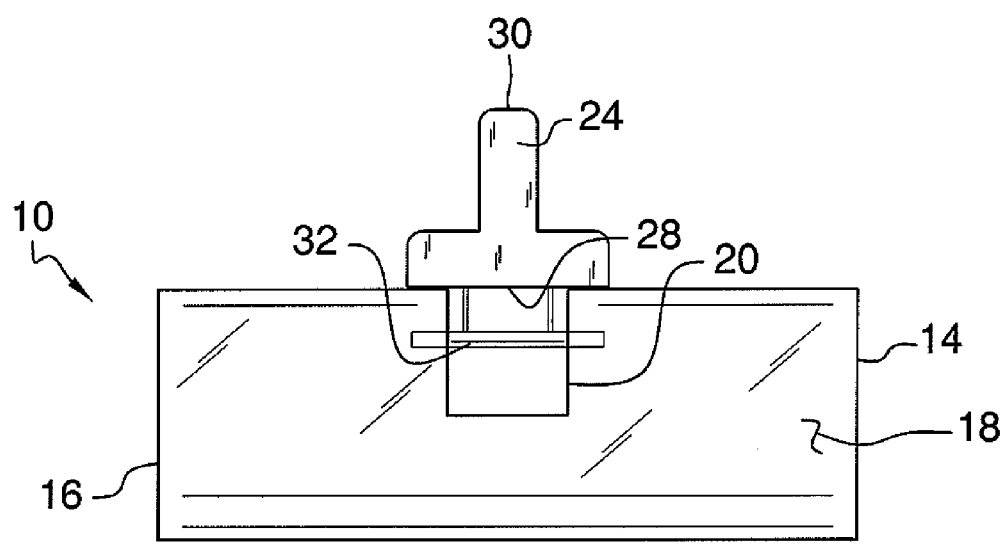
FIG. 4 is a front view of an embodiment of the disclosure.

As best illustrated in FIGS. 1 through 5, the ultrasound training assembly 10 generally comprises a tubular member 12 that has a first end 14, a second end 16 and a perimeter wall 18 extending between the first 14 and second 16 ends. The perimeter wall 18 has an aperture 20 therein. The perimeter wall 18 is transparent and may be comprised of a plastic material. The tubular member 12 has a circular cross-section taken perpendicular to a longitudinal axis of the tubular member 12 extending through the first 14 and second 16 ends. The aperture 20 extends between 25% and 60% of a circumference of the perimeter wall 18. The tubular member 12 has a diameter between 2.5 inches and 5 inches and a length between 6 inches and 18 inches. As shown in FIG. 3, the tubular member 12 may be provided in a number of sizes depending upon its representation of a limb.

A model 22 representing an ultrasound probe is provided. The model 22 includes a grip 24 and a head 26 attached together. The head 26 has a distal edge 28 with respect to the grip 24. The distal edge 28 is elongated. The grip 24 and the head 26 form a T-shape though other shapes may be used depending upon the ultrasound probe being represented.

An elongated member 32 is attached to the distal edge 28 and has a longitudinal axis orientated perpendicular to a longitudinal axis of the model 22 extending through the distal edge 28 and a free end 30 of the grip 24. The elongated member 32 is spaced from the distal edge 28 a distance between 0.5 inches and 2 inches. The elongated member 32 is cylindrical shaped and has a diameter less than ½ inch. The elongated member 32 comprises a resiliently bendable material. A pair of arms 34 attaches the elongated member 32 to the distal edge 28. The arms 34 are spaced from opposite ends 36 of the elongated member 32 a distance less than a length of the aperture 20 measured along the longitudinal axis of the tubular member 12 to ensure that that the elongated member 32 is positionable through the aperture 20. Each of the arms 34 is orientated parallel with the longitudinal axis of the model 22.

Figure 5:
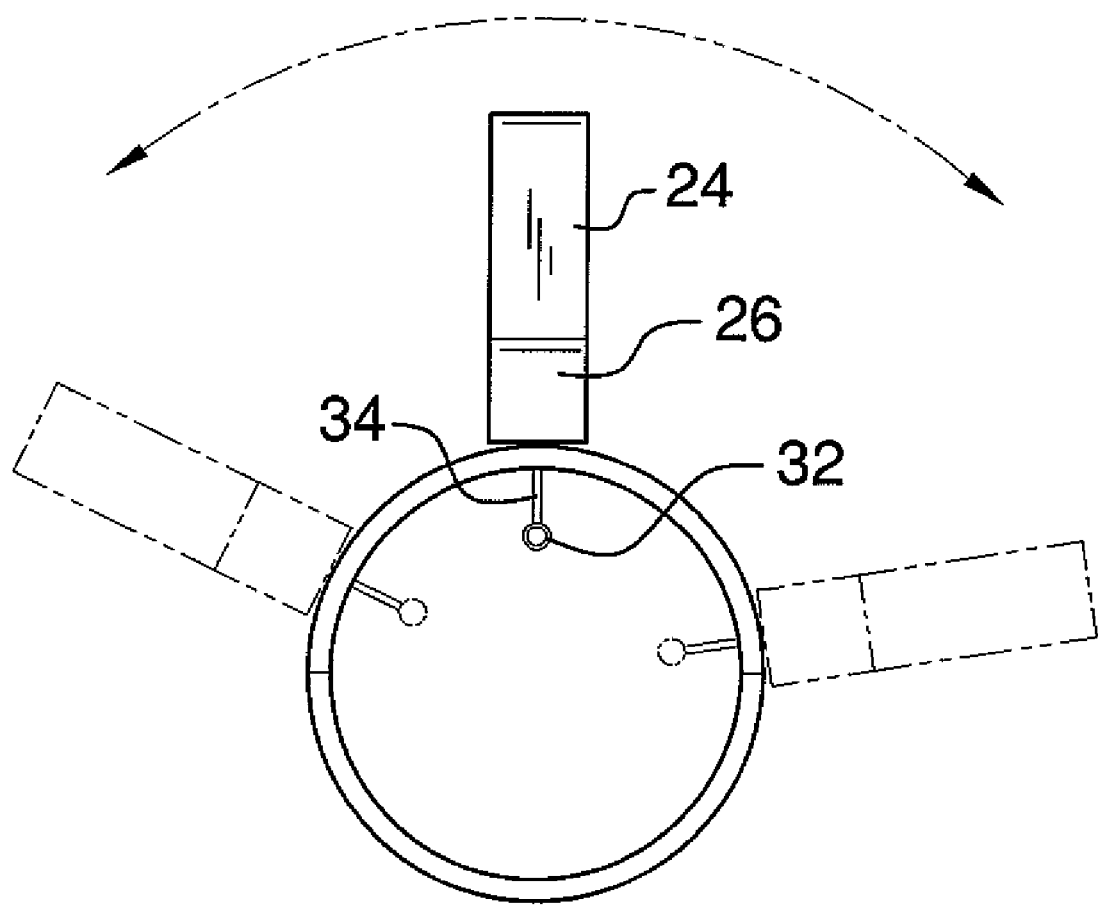
FIG. 5 is a side view of an embodiment of the disclosure.

In use, the elongated member 32 is placed in the tubular member 12 through the aperture 20 to represent a vein which would be seen by an ultrasound probe represented by the model. By moving the model 22, as shown in FIG. 5, a phlebology or sonography student will better understand the relationship between the angle of an ultrasound probe and the location of the vein which is detected with the probe. The tubular member 12 represents a limb in which the vein is positioned.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An ultrasound training assembly to indicate what direction a vein will be spotted while utilizing an ultrasound apparatus, said assembly including:

a tubular member having a first end, a second end and a perimeter wall extending between said first and second ends, said perimeter wall having an aperture therein;

a model representing an ultrasound probe, said model including a grip and a head attached together, said head having a distal edge with respect to said grip, said distal edge being elongated;

an elongated member being attached to said distal edge and having a longitudinal axis orientated perpendicular to a longitudinal axis of said model extending through said distal edge and a free end of said grip, said elongated member being spaced from said distal edge a distance between 0.5 inches and 2 inches; and wherein said elongated member is placed in said tubular member through said aperture to represent a vein which would be seen by an ultrasound probe represented by said model.

2. The assembly according to claim 1, wherein said perimeter wall is transparent.

3. The assembly according to claim 1, wherein said tubular member has a circular cross-section taken perpendicular to a longitudinal axis of said tubular member extending through said first and second ends.

4. The assembly according to claim 3, wherein said aperture extending between 25% and 60% of a circumference of said perimeter wall.

5. The assembly according to claim 4, wherein said tubular member has a diameter between 2.5 inches and 5 inches and a length between 6 inches and 18 inches.

6. The assembly according to claim 1, wherein said elongated member is cylindrical shaped and comprises a resiliently bendable material.

7. The assembly according to claim 6, wherein a pair of arms attaches said elongated member to said distal edge, said arms being spaced from opposite ends of said elongated member a distance less than a length of said aperture measured along said longitudinal axis of said tubular member.

8. An ultrasound training assembly to indicate what direction a vein will be spotted while utilizing an ultrasound apparatus, said assembly including:

a tubular member having a first end, a second end and a perimeter wall extending between said first and second ends, said perimeter wall having an aperture therein, said perimeter wall being transparent, said tubular member having a circular cross-section taken perpendicular to a longitudinal axis of said tubular member extending through said first and second ends, said aperture extending between 25% and 60% of a circumference of said perimeter wall, said tubular member having a diameter between 2.5 inches and 5 inches and a length between 6 inches and 18 inches;

a model representing an ultrasound probe, said model including a grip and a head attached together, said head having a distal edge with respect to said grip, said distal edge being elongated, said grip and said head forming a T-shape;

an elongated member being attached to said distal edge and having a longitudinal axis orientated perpendicular to a longitudinal axis of said model extending through said distal edge and a free end of said grip, said elongated member being spaced from said distal edge a distance between 0.5 inches and 2 inches, said elongated member being cylindrical shaped, said elongated member comprising a resiliently bendable material, a pair of arms attaching said elongated member to said distal edge, said arms being spaced from opposite ends of said elongated member a distance less than a length of said aperture measured along said longitudinal axis of said tubular member, each of said arms being orientated parallel with said longitudinal axis of said model; and wherein said elongated member is placed in said tubular member through said aperture to represent a vein which would be seen by an ultrasound probe represented by said model.

* * * * *